Patented Nov. 21, 1944

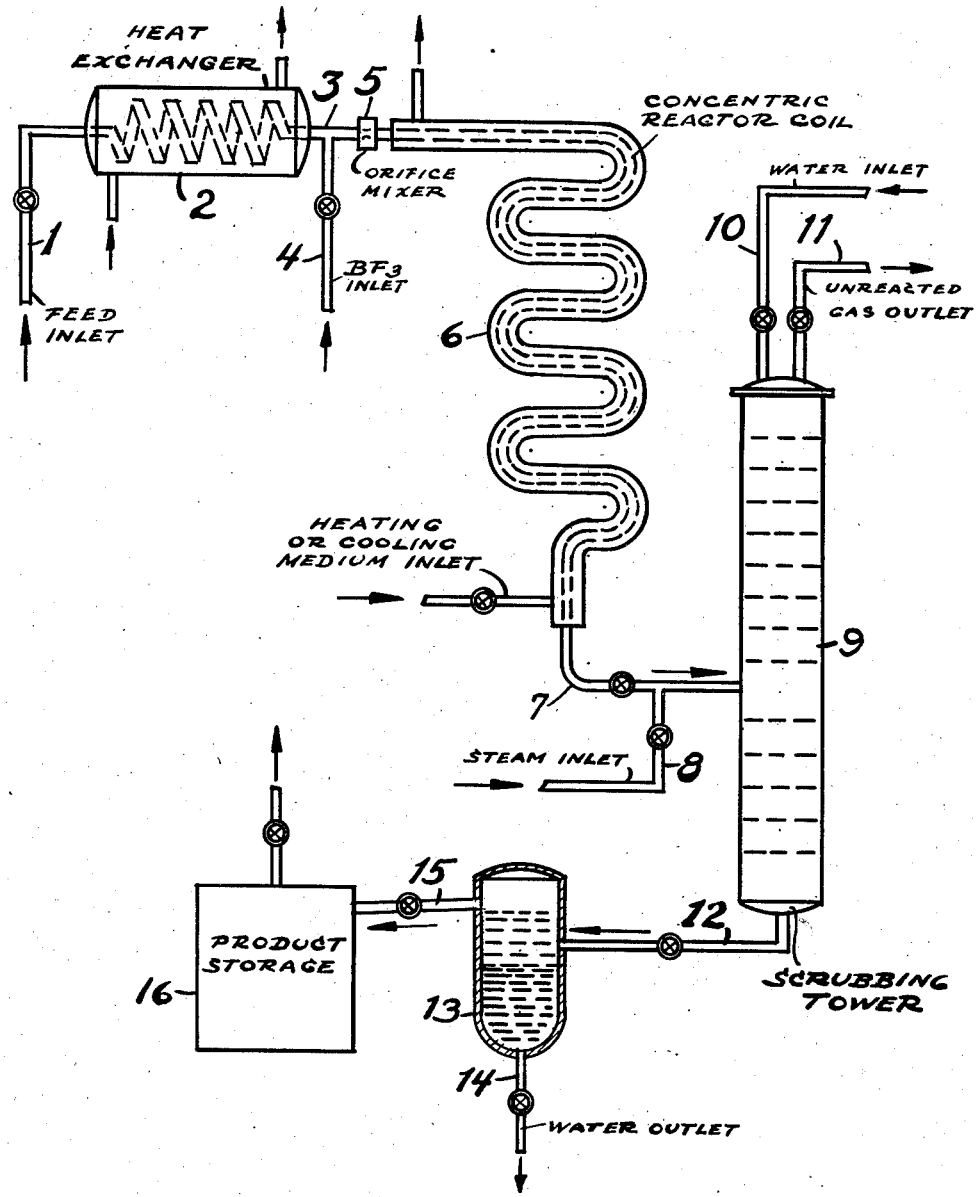

2,363,221

UNITED STATES PATENT OFFICE 2,363,221

POLYMERIZATION OF HYDROCARBONS

Lewis A. Bannon, Baton Rouge, La., assignor to Standard Oil Development Company, a corporation of Delaware Application December 15, 1942, Serial No. 469,049

2 Claims. (Cl. 260—683.15)

This invention relates to the manufacture of olefin polymers, especially those of the type which are suitable for use in the manufacture of motor fuels and hydrocarbon products of similar boiling range.

The invention is particularly concerned with a practical method for the production of "safety" fuels for aviation purposes, that is, fuels having low vapor pressures. The manufacture of such fuels has become of great importance in recent years, more particularly because of the tendency toward flying at very high altitudes, where the rapid vaporization of fuels presents a serious problem. This vaporization means the loss of the fractions of the fuel having the highest octane number. There is also the great danger of vapor lock, involving loss of power, increased consumption of fuel and sometimes even actual engine stoppage. It is an object of the invention to provide a means for converting readily available petroleum products into fuels suitable for operating airplane engines and having a distinctly higher boiling range than gasoline as well as a high flash point.

Methods have been proposed for the manufacture of diisobutylene from petroleum refinery $C_4$ cuts containing isobutylene. Hydrogenated diisobutylene is a product having a high octane rating and is used for blending with motor fuels of the gasoline range to improve their octane number. Such fuels have a relatively high volatility and low flash point and create a fire hazard when used under conditions where sparks may be encountered. It has been found, however, that hydrogenated triisobutylene has a boiling range of 170°–200° C., which is within the range required for "safety" fuels and has a remarkably high octane number, i. e., of the order of 98 to 99 (A. S. T. M. clear) or even higher. It is therefore well suited for use alone as a "safety" fuel or in blends of such fuels. The present invention provides a simple and direct means for producing triisobutylene from isobutylene or from a refinery $C_4$ cut and for converting the same into the hydrogenated product.

Processes of preparing isobutylene polymers from isobutylene or hydrocarbon mixtures containing isobutylene by absorption in sulfuric acid and heating the extract so formed are well known. Processes of this kind have generally been directed to the formation of products having a major proportion of diisobutylene. Similar processes have been proposed using gaseous boron fluoride or hydrated boron fluoride as the catalyst. Again, the object of such processes has been to form large proportions of diisobutylene or products boiling within the gasoline range. The present invention provides a process which makes possible the production of very high percentages of trimer in the polymerized product and only quite small percentages of the dimer or products of higher molecular weight than the trimer. These results are accomplished by employing boron fluoride in the gaseous phase as a catalyst and by providing for a very short time of contact between the gaseous hydrocarbon feed and the catalyst. Sufficient catalyst is used to provide for rapid conversion of the isobutylene to trimer during the reaction period, while the limited contact time prevents the formation of undesired quantities of higher polymers. The use of boron fluoride as a catalyst instead of sulfuric acid has a distinct advantage in the preparation of products which are to be hydrogenated to form motor fuels, since a sulfuric acid catalyst contains sulfur compounds which are difficult to remove and which poison well known hydrogenation catalysts, such as the Raney nickel catalyst. The boron fluoride catalyst does not possess this disadvantage.

In accordance with the present invention the contact time is limited to a period less than one second, preferably a period of about $\frac{1}{5}$ to $\frac{1}{2}$ second, and the amount of catalyst used is preferably between about 0.1 to about 1% by weight, based on the amount of isobutylene present, whether in the pure state or in admixture with other hydrocarbons. The limitation in contact time may be provided by rendering the catalyst inactive immediately on leaving the reaction zone. This may be done in several ways, e. g., by introducing steam, large amounts of water, or gaseous ammonia into the reaction mixture, or by passing the effluent from the reactor through an aqueous caustic alkali or ammonia solution. By employing this process, yields of trimer as high as 60 to 80%, or even higher, based on the isobutylene feed, may be obtained, while yields of dimer may be made as low as 5%, and the yields of polymers higher than the trimer may be as low as 15%.

Other reaction conditions are not particularly critical. Temperatures ranging from normal room temperature up to about 150° C. are in general preferred, while the pressure may range from 2 to 500 lbs. absolute. In any given case the use of a higher temperature will make possible the use of a correspondingly lower percentage of boron fluoride. Unreacted gases may be recycled to the reactor or passed through a second reactor, after removal of the product, to increase the conversion ratio.

Suitable feed stocks for the processes of this invention include not only pure isobutylene but mixtures of the same with normal butylene or other straight chain olefins and/or with low molecular weight paraffin hydrocarbons, such as the $C_4$ refinery cuts obtained in the distillation and cracking of petroleum, which contain at least 5%, generally 10% to 20%, of isobutylene as well as substantial quantities of n-butylene and butanes. The hydrocarbon mixture should be completely gaseous at the reaction temperatures used.

The present invention is illustrated by the following example showing the results obtained by employing one set of conditions within the scope of the invention, but the invention is not limited by this example in any way.

Example 1

Isobutylene of about 98% to 99% purity was fed into the top of a vertical reaction tube, which was heated by a steam jacket, and boron fluoride was simultaneously introduced into the reactor at such a rate that its proportion was about 0.57% by weight, based on the isobutylene present. A temperature of about 60° C. was maintained within the reaction tube. The rate of inflow of the isobutylene was about 70.7 grams per minute, which amounted to a rate of 2.62 volumes of feed/reactor volume/second. A substantial yield of polymer was continuously formed, and the reaction mixture was passed from the reaction tube into a steam chamber, where the catalyst was immediately rendered inactive. The total products, after leaving the steam chamber, passed downward through a condenser into a water seal and then into a separator which provided for gravity separation of the water from the polymer product. The total yield of trimer compared to total polymer, as measured by the amount of product boiling between 172° and 180° C., was 59% by volume. The total yield of polymer in the motor fuel range (B. P.=98° to 200° C.), based on total polymer, was 83.6% by volume. The trimer fraction was hydrogenated and found to yield a product having an A. S. T. M. octane number of 99.6.

A preferred form of apparatus suitable for carrying out the process of the present invention is shown in detail in the accompanying drawing, which is a schematic outline of the same, and by the following description.

In an operation employing such apparatus the hydrocarbon feed containing isobutylene is introduced by means of line 1 into heat exchanger 2, and from there the feed passes into line 3, where it mixes with boron fluoride gas introduced by line 4. The gases are thoroughly mixed by any suitable means such as an orifice mixer 5, and pass through a concentric reactor coil 6, in which the temperature is carefully controlled by means of a heating or cooling fluid. From this reactor coil the products of reaction pass into line 7 and are met by an inflowing quantity of steam introduced into line 7 by means of line 8. The mixture passes into a scrubbing tower 9, where the catalyst activity may be further quenched by water introduced into the top of the same by means of line 10, and where unreacted gases separate and pass from the top of the tower by means of line 11. The products of reaction pass from the bottom of the scrubbing tower through line 12 to a separator 13, where the water separates from the polymer product by gravity and is drawn off through line 14. The product passes from the upper portion of the separator through line 15 to a storage vessel 16.

It is to be understood that the foregoing description of a prefered form of apparatus is only illustrative and that many variations in the various units described may be employed. For example, instead of the concentric reactor coil any other suitable reactor may be used, such as a packed tower, or a coil immersed in a heating medium.

The present invention is not to be considered as being limited in any way by the examples, which are given by way of illustration only, nor by any theory as to its operation, but is to be considered as being limited solely by the terms of the appended claims.

I claim:

1. The method of preparing a hydrocarbon product containing a major proportion of triisobutylene which comprises exposing a hydrocarbon material, comprising chiefly $C_4$ hydrocarbons and containing substantial quantities of isobutylene, in the gaseous phase with about 0.1 to about 1.0% by weight of gaseous boron fluoride for a period of less than one second at a reaction temperature from about room temperature to about 100 to 150° C., contacting the reaction product so formed with a material, which renders the boron fluoride immediately inactive as a catalyst, and separating the said material from the hydrocarbon reaction product.

2. The method of preparing a hydrocarbon product containing a major proportion of triisobutylene which comprises rapidly passing gaseous isobutylene, together with .10 to 1.0% of its weight of boron fluoride, through a reactor at the rate such as to provide a reaction time of from about 0.20 to 0.50 second, maintaining within the reactor a temperature of from about 25° to 150° C., passing the effluent from the reactor into the presence of a sufficient volume of steam to immediately render the boron fluoride inactive as a catalyst for the continued polymerization of isobutylene, cooling the total product to condense the steam, and separating the hydrocarbon product from the water present.

LEWIS A. BANNON.